US011360773B2

(12) United States Patent
Al Sheikh et al.

(10) Patent No.: US 11,360,773 B2
(45) Date of Patent: *Jun. 14, 2022

(54) REUSING FETCHED, FLUSHED INSTRUCTIONS AFTER AN INSTRUCTION PIPELINE FLUSH IN RESPONSE TO A HAZARD IN A PROCESSOR TO REDUCE INSTRUCTION RE-FETCHING

(71) Applicant: Microsoft Technology Licensing, LLC, Redmond, WA (US)

(72) Inventors: Rami Mohammad Al Sheikh, Morrisville, NC (US); Michael Scott McIlvaine, Raleigh, NC (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/907,988

(22) Filed: Jun. 22, 2020

(65) Prior Publication Data

US 2021/0397453 A1 Dec. 23, 2021

(51) Int. Cl.
*G06F 9/38* (2018.01)
(52) U.S. Cl.
CPC .......... *G06F 9/3808* (2013.01); *G06F 9/3861* (2013.01); *G06F 9/3867* (2013.01)
(58) Field of Classification Search
CPC .... G06F 9/3808; G06F 9/3861; G06F 9/3867; G06F 9/3863
See application file for complete search history.

(56) References Cited

U.S. PATENT DOCUMENTS 5,845,103 A * 12/1998 Sodani ............... G06F 9/3004
712/216
5,881,277 A 3/1999 Bondi et al.
(Continued)

OTHER PUBLICATIONS

"MicroBlaze Processor Reference Guide", Retrieved from: https://www.xilinx.com/support/documentation/sw_manuals/xilinx14_7/mb_ref_guide.pdf, Jun. 2006, 262 Pages.
(Continued)

*Primary Examiner* — Jyoti Mehta
*Assistant Examiner* — Courtney P Carmichael-Moody
(74) *Attorney, Agent, or Firm* — Withrow & Terranova, PLLC

(57) ABSTRACT

Reusing fetched, flushed instructions after an instruction pipeline flush in response to a hazard in a processor to reduce instruction re-fetching is disclosed. An instruction processing circuit is configured to detect fetched performance degrading instructions (Pals) in a pre-execution stage in an instruction pipeline that may cause a precise interrupt that would cause flushing of the instruction pipeline. In response to detecting a PDI in an instruction pipeline, the instruction processing circuit is configured to capture the fetched PDI and/or its successor, younger fetched instructions that are processed in the instruction pipeline behind the PDI, in a pipeline refill circuit. If a later execution of the PDI in the instruction pipeline causes a flush of the instruction pipeline, the instruction processing circuit can inject the fetched PDI and/or its younger instructions previously captured from the pipeline refill circuit into the instruction pipeline to be processed without such instructions being re-fetched.

23 Claims, 6 Drawing Sheets

(56) References Cited

U.S. PATENT DOCUMENTS

| | | | |
|---|---|---|---|
| 6,076,153 A | 6/2000 | Grochowski et al. | |
| 6,694,425 B1 | 2/2004 | Eickemeyer | |
| 8,028,151 B2* | 9/2011 | Abernathy | G06F 9/3855 |
| | | | 712/219 |
| 8,909,908 B2* | 12/2014 | Hooker | G06F 9/3861 |
| | | | 712/239 |
| 9,785,538 B2 | 10/2017 | Brites et al. | |
| 2006/0179274 A1* | 8/2006 | Jones | G06F 9/3802 |
| | | | 712/205 |
| 2006/0184778 A1 | 8/2006 | Levitan et al. | |
| 2008/0148026 A1* | 6/2008 | Dhodapkar | G06F 9/3844 |
| | | | 712/228 |
| 2009/0063819 A1 | 3/2009 | Doing et al. | |
| 2013/0318332 A1 | 11/2013 | Gonion | |
| 2014/0019734 A1* | 1/2014 | Chaussade | G06F 9/30145 |
| | | | 712/227 |
| 2015/0074381 A1* | 3/2015 | Bose | G06F 9/3808 |
| | | | 712/220 |
| 2017/0075692 A1 | 3/2017 | Kothinti Naresh et al. | |
| 2017/0139716 A1 | 5/2017 | Caulfield et al. | |
| 2019/0155608 A1 | 5/2019 | Perais et al. | |
| 2019/0377580 A1 | 12/2019 | Vorbach et al. | |

OTHER PUBLICATIONS

"International Search Report and Written Opinion Issued in PCT Application No. PCT/US21/029028", dated Jul. 21, 2021, 10 Pages.

* cited by examiner

REUSING FETCHED, FLUSHED INSTRUCTIONS AFTER AN INSTRUCTION PIPELINE FLUSH IN RESPONSE TO A HAZARD IN A PROCESSOR TO REDUCE INSTRUCTION RE-FETCHING

FIELD OF THE DISCLOSURE

The technology of the disclosure relates to computer processors ("processors"), and more particularly to fetching of computer program instructions to be executed in the processor.

BACKGROUND

Microprocessors, also known as "processors," perform computational tasks for a wide variety of applications. A conventional microprocessor includes a central processing unit (CPU) that includes one or more processor cores, also known as "CPU cores." The CPU executes computer program instructions ("instructions"), also known as "software instructions," to perform operations based on data and generate a result, which is a produced value. The handling of each instruction in the processor is split into a series of different stages or steps known as instruction pipelining. This allows multiple instructions to be processed at the same time in different stages to increase instruction processing throughput, as opposed to each instruction being processed sequentially and fully executed before processing a next instruction. Instruction pipelining steps are executed in one or more instruction pipelines in the processor, each composed of multiple process stages.

Optimal processor performance can be achieved if all pipeline stages in an instruction pipeline are able to process instructions concurrently in the instruction pipeline. However, hazards can occur in an instruction pipeline where an instruction cannot be executed without leading to incorrect computation results. One example of a hazard that can cause an instruction pipeline to be flushed is a structural hazard. An example of a structural hazard is a load instruction that fails to load an entry into a load queue that may be full. If the load instruction cannot execute, a deadlock could occur in the instruction pipeline. Another example of a hazard that can cause an instruction pipeline to be flushed is control hazard resulting from execution of a control flow instruction that causes a precise interrupt in the processor. One example of a control flow instruction that can cause a control hazard is a conditional branch instruction. A conditional branch instruction includes a predicate condition that is not fully evaluated in a later execution stage in an instruction pipeline to determine if the instruction flow will branch or not branch. So as to not have to stall the fetching of successor, younger instructions behind the conditional branch instruction into an instruction pipeline before the conditional branch instruction is executed, a control flow prediction circuit can be provided in the processor to speculatively predict the branch target address of the conditional branch instruction. The processor can then speculatively fetch subsequent instructions in the fetch stages of an instruction pipeline following the fetch of a conditional branch instruction based on the prediction of a branch target address.

If the actual resolved branch target address is determined in execution to match the predicted branch address, a stall is not incurred in the instruction pipeline. This is because the subsequent instructions starting at the predicted branch target address will have been correctly fetched and already be present in the instruction pipeline when the conditional branch instruction reaches the execution stage of an instruction pipeline. However, if the predicted and resolved branch target addresses do not match, a mispredicted branch hazard occurs in the instruction pipeline that causes a precise interrupt. As a result, the instruction pipeline is flushed of existing, previously fetched instructions in the various stages of the instruction pipeline. The fetch stage of the instruction pipeline is instructed to fetch new instructions starting from the correct, resolved branch target. Thus, stages in the instruction pipeline will remain dormant until the newly fetched instructions make their way through the instruction pipeline to be processed and executed, thereby reducing instruction throughput performance.

There are also other situations that can be encountered when processing instructions beyond a branch instruction that can cause structural hazards and thus cause a flush of an instruction pipeline. Examples include deadlocks and instructions that cannot be executed due to lack of resources, such as available space in a queue.

SUMMARY

Exemplary aspects disclosed herein include reusing fetched, flushed instructions after an instruction pipeline flush in response to a hazard in a processor to reduce instruction re-fetching. The processor includes an instruction processing circuit that is configured to fetch instructions into an instruction pipeline to be processed and executed in an execution stage as part of instruction pipelining. The execution circuit in the instruction processing circuit is configured to generate a precise interrupt in response to encountering a hazard (e.g., a structural or control flow hazard) when executing an instruction. For example, the precise interrupt may have been generated as a result of a mispredicted conditional branch instruction wherein successor, control dependent instructions on the conditional branch instruction from an incorrect instruction flow path are already fetched into the instruction pipeline. In response the precise interrupt, the instruction processing circuit is configured to flush the instruction that caused the precise interrupt and its successor, younger instructions in the instruction pipeline to overcome the hazard. This results in a reduced instruction throughput in the instruction pipeline. If these already fetched instructions can be reused in the instruction pipelining after flushing without having to be re-fetched, these already fetched instructions can be injected into in the instruction pipeline without the need to re-fetch these instructions, thus mitigating the decreased instruction from flushing.

In this regard, in exemplary aspects disclosed herein, the instruction processing circuit in the processor is configured to detect fetched instructions in a pre-execution stage in an instruction pipeline that may cause a precise interrupt that would cause flushing of an instruction pipeline. These instructions can be referred to as performance degrading instructions (PDIs). For example, the instruction processing circuit may be configured to detect PDIs after being decoded in a decoding stage of the instruction pipeline. In response to detecting a PDI in the instruction pipeline, the instruction processing circuit is configured to capture the fetched PDI (if not already present) as well as successor, younger fetched instructions that are processed in the instruction pipeline behind the PDI, in a pipeline fetch refill circuit. Thus, if an execution of the PDI in the instruction pipeline causes a precise interrupt to occur that causes a flush of the instruction pipeline (a flush event), the instruction processing circuit can then determine if a detected instruction (i.e., a PDI and/or a successor instruction) is present in the pipeline fetch refill circuit as having been previously captured. If the detected instruction present in the pipeline fetch refill circuit, the instruction processing circuit can inject the detected instruction and its successor, younger instructions that were previously captured in the pipeline fetch refill circuit into the instruction pipeline to be processed without such instructions having to be re-fetched. Thus, the latency associated with re-fetching these instructions would not be incurred in the instruction throughput of the instruction pipeline. The instruction processing circuit can provide the "fall-through" program counter (PC) to the fetch stage in the instruction pipeline to know where to begin re-fetching instructions that have to be fetched in response to the flush event, because they cannot be injected from the pipeline fetch refill circuit. The fall-through PC is the PC of the next instruction following the last captured younger instruction in the pipeline fetch refill circuit. The instruction processing circuit can be configured to capture the fall-through PC in the pipeline fetch refill circuit associated with a captured PDI.

In other exemplary aspects, the instruction pipeline circuit can also be configured to capture instruction flow path information in the instruction processing circuit for a PDI that has a variable instruction flow path. For example, the instruction flow path taken following a conditional branch instruction or indirect branch instruction varies based on the resolution of the branch behavior of such instruction. In this manner, the particular instruction flow path of the captured successor, younger instructions from the captured PDI is known. In response to detection and determination of the presence of the PDI in the pipeline fetch refill circuit in response to a flush event, the instruction processing circuit can also determine if a captured, younger control dependent instruction from the PDI should be injected into the instruction pipeline as being from a correct instruction flow path. If the captured, younger control dependent instruction is from a correct resolved instruction flow path from the PDI, the younger control dependent instruction can be injected into the instruction pipeline as being known to be from a correct instruction flow path of the PDI without having to be re-fetched. If the captured, younger control dependent instruction is determined to not be from a correct instruction flow path from the PDI, the younger control dependent instruction can be ignored and re-fetched. The instruction flow path information does not need to be recorded for younger instructions that are control independent on the PDI, because control independent instructions do not depend on a resolved instruction flow path from the PDI.

In this regard, in one exemplary aspect, a processor is provided. The processor comprises an instruction processing circuit. The instruction processing circuit comprises an instruction fetch circuit configured to fetch a plurality of instructions as a plurality of fetched instructions from a program code into an instruction pipeline to be executed. The instruction processing circuit also comprises an execution circuit coupled to the instruction fetch circuit, the execution circuit configured to execute a fetched instruction among the plurality of fetched instructions in the instruction pipeline, and generate a pipeline flush event to flush the instruction pipeline in response to the execution of a fetched instruction among the plurality of instructions comprising a PDI generating a hazard. The processor also includes an instruction fetch reuse circuit coupled to the instruction pipeline. The instruction fetch reuse circuit is configured to, in response to the pipeline flush event, determine if a source identification of the fetched instruction matches a source identification in a refill tag in a fetch refill entry as a matching fetch refill entry among a plurality of fetch refill entries of a pipeline fetch refill circuit. In response to the source identification of the fetched instruction matching the source identification in the refill tag in the fetch refill entry, the instruction fetch reuse circuit is configured to insert one or more captured instructions in the matching fetch refill entry into the instruction pipeline after the instruction fetch circuit to be processed.

In another exemplary aspect, a method of reusing fetched, flushed instructions in an instruction pipeline in a processor is provided. The method comprises fetching a plurality of instructions as a plurality of fetched instructions from a program code into an instruction pipeline to be executed. The method also comprises executing a fetched instruction among the plurality of fetched instructions in the instruction pipeline. The method also comprises generating a pipeline flush event to flush the instruction pipeline in response to the executing of a fetched instruction among the plurality of instructions generating a hazard as a PDI. In response to the pipeline flush event, the method also comprises determining if a source identification of a detected instruction matches a source identification in a refill tag in a fetch refill entry as a matching fetch refill entry among a plurality of fetch refill entries of a pipeline fetch refill circuit. In response to the source identification of the detected instruction matching the source identification in the refill tag in the fetch refill entry, the method also comprises inserting one or more captured instructions in the matching fetch refill entry into the instruction pipeline as fetched instructions to be executed.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 1 is a diagram of an exemplary processor-based system that includes a processor with an instruction processing circuit that includes one or more instruction pipelines for processing computer instructions, wherein the instruction processing circuit is configured to reuse a captured, fetched instruction (i.e.; a fetched PDI and/or its captured, fetched, successor, younger instructions) in the instruction pipeline to be processed in response to a pipeline flush caused by execution of the captured PDI, to avoid the need to re-fetch the PDI and its younger instructions to be processed;

Figure 1:
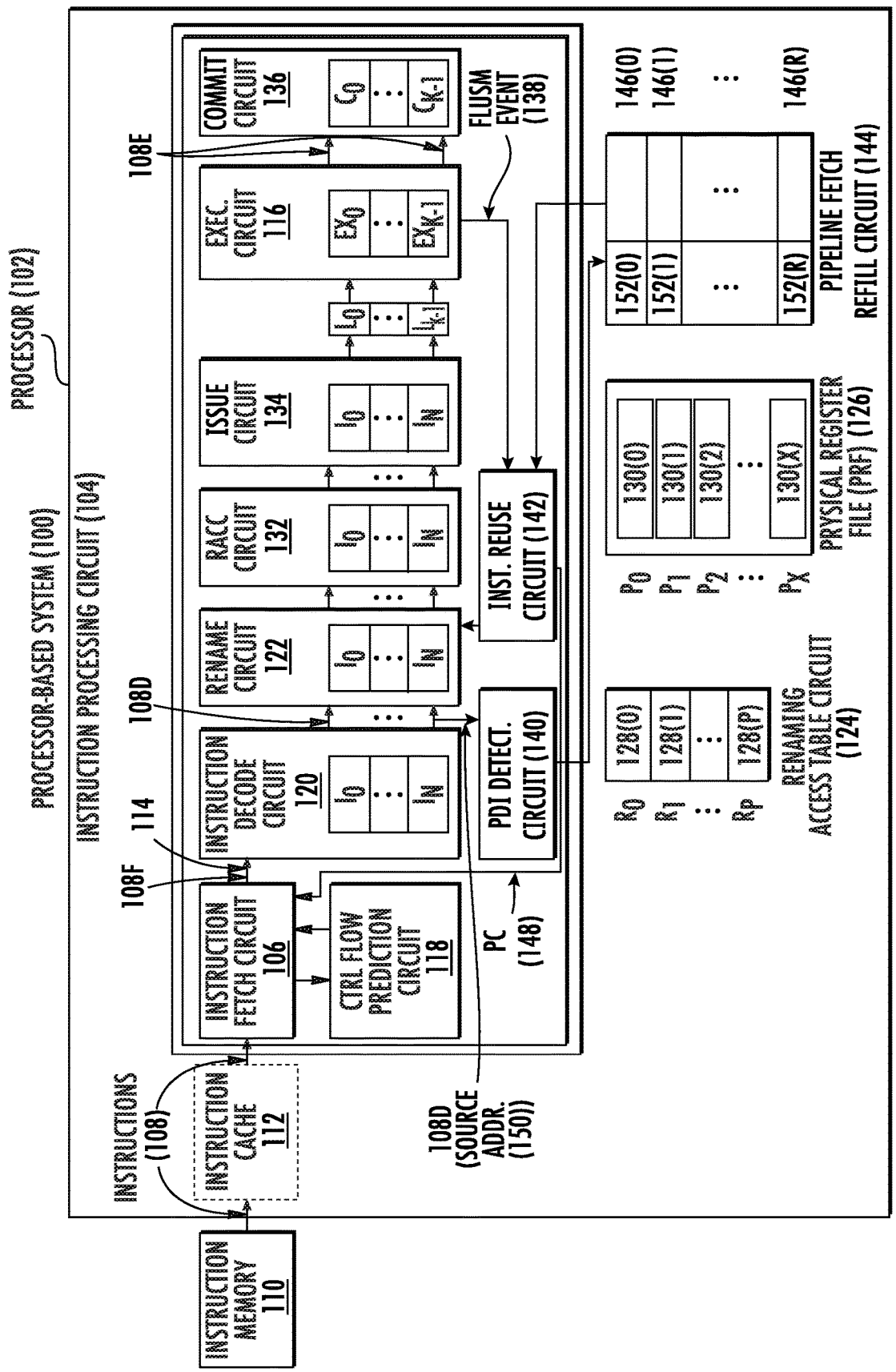
Figure 2A:
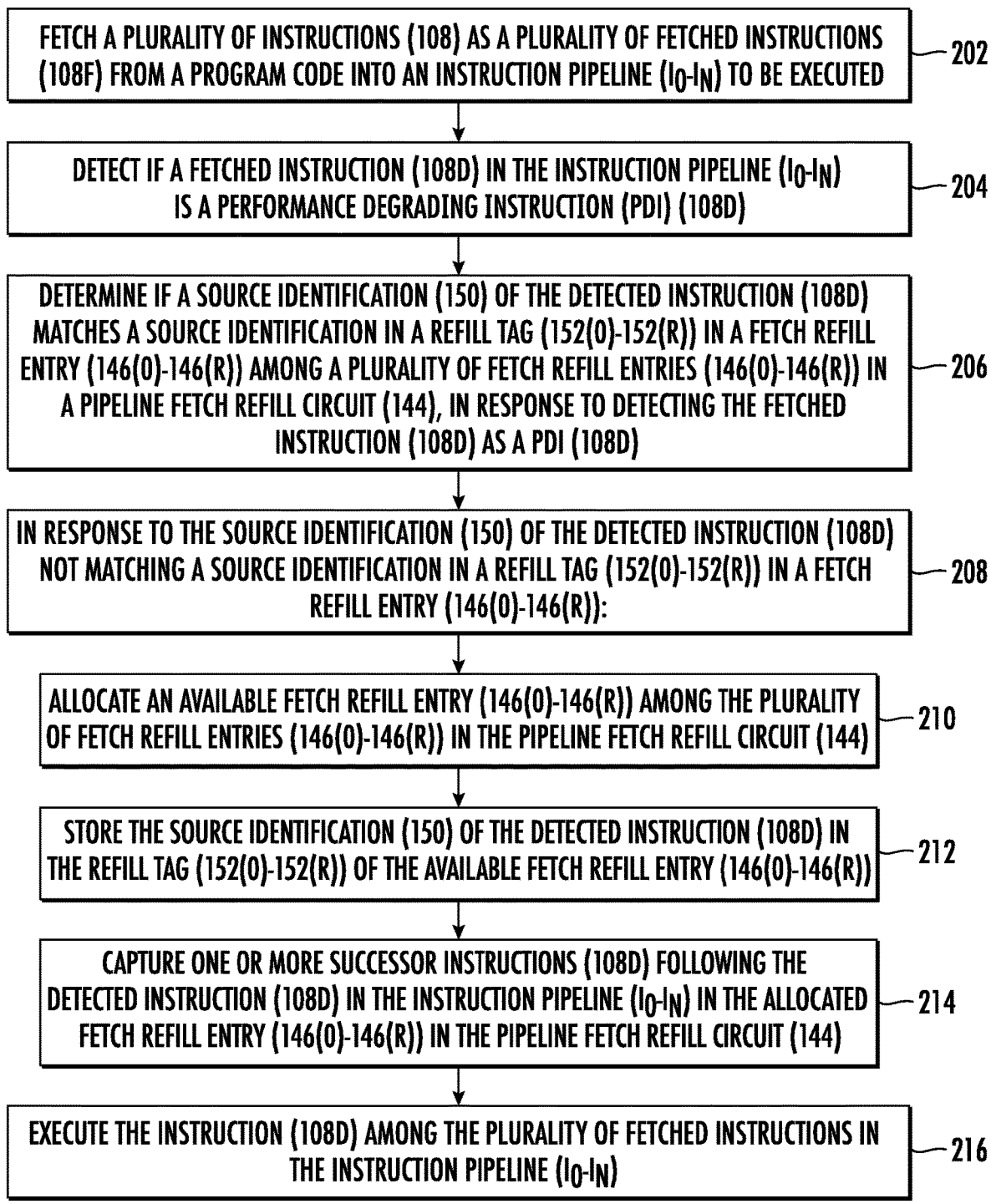
FIG. 2A is a flowchart illustrating an exemplary process of the instruction processing circuit in FIG. 1 detecting and capturing fetched instructions in the instruction pipeline into the pipeline fetch refill circuit.
Figure 2B:
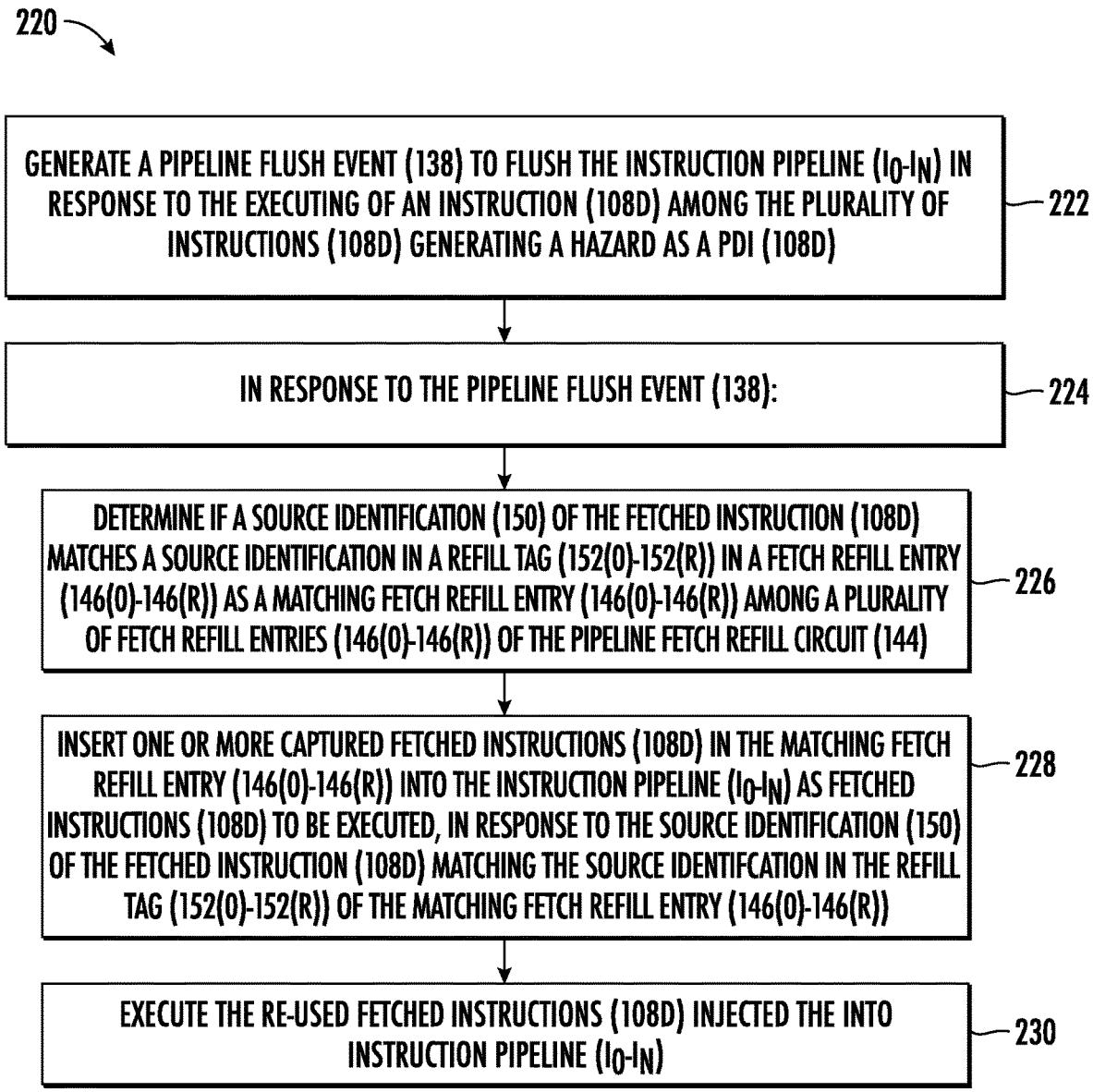
FIG. 2B is a flowchart illustrating an exemplary process of the instruction processing circuit in FIG. 1 reusing a captured, fetched instruction from a pipeline fetch refill circuit in an instruction pipeline in response to a flush event caused by execution of the PDI.
Figure 3:
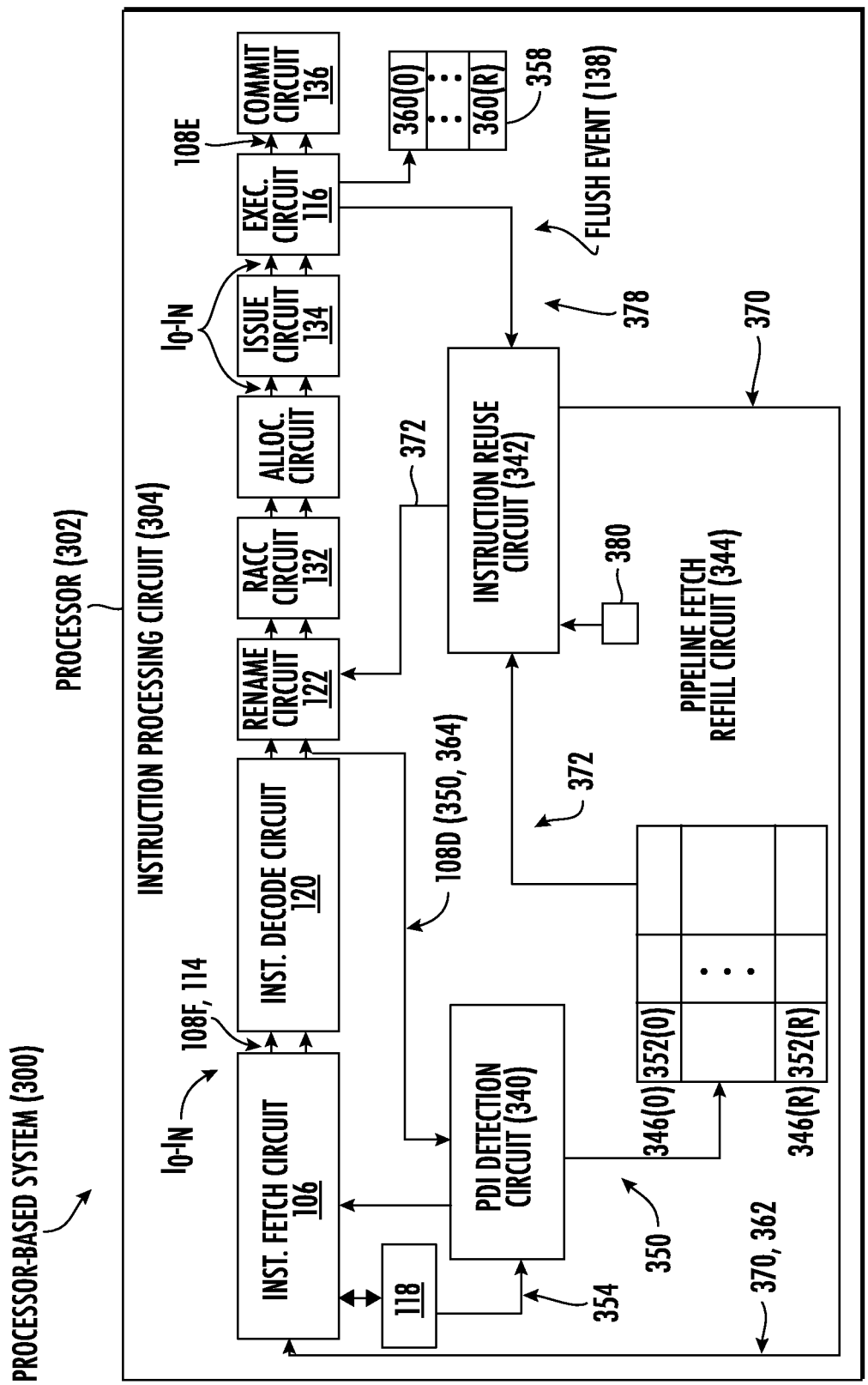
Figure 4:
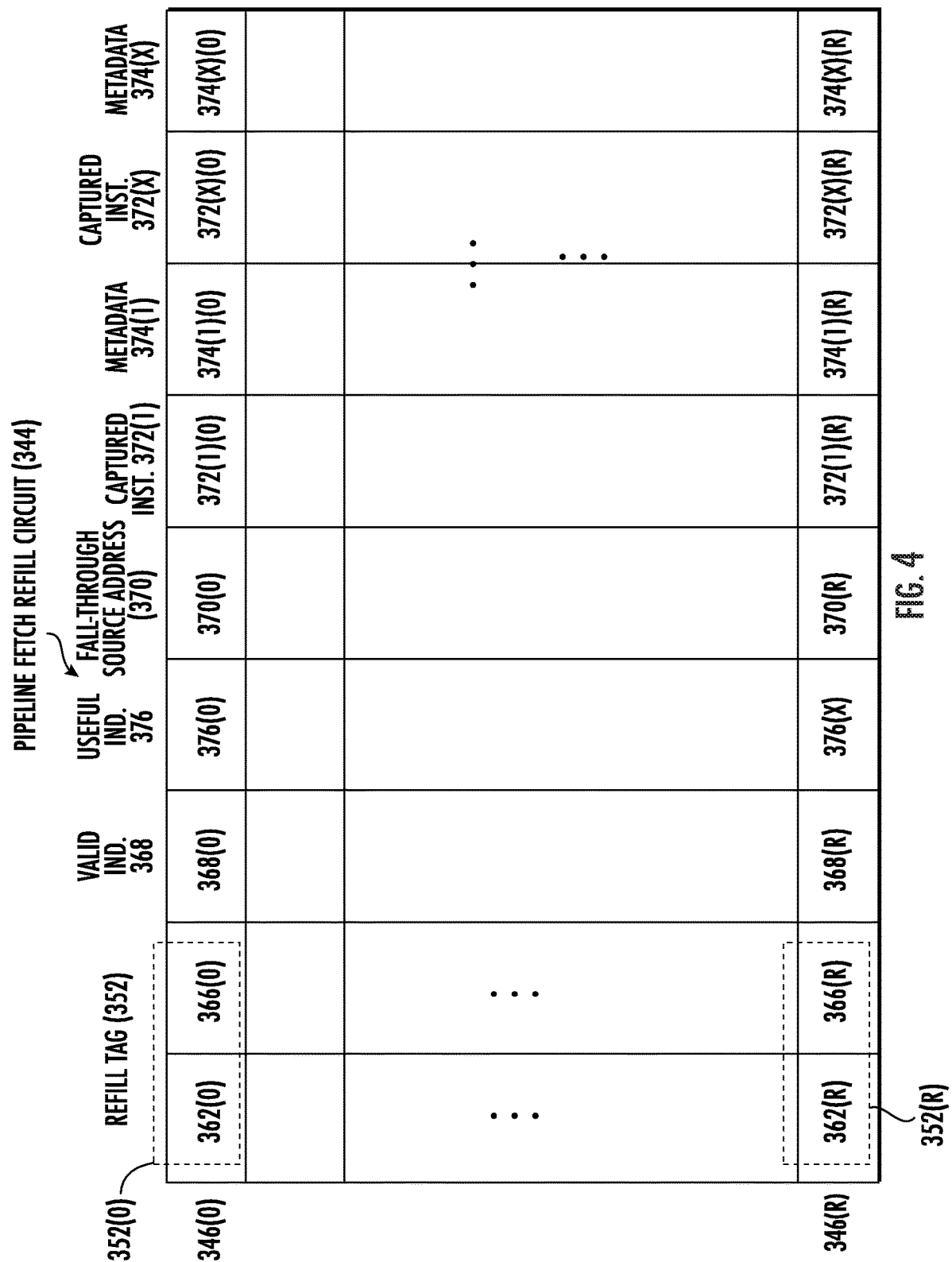
Figure 5:
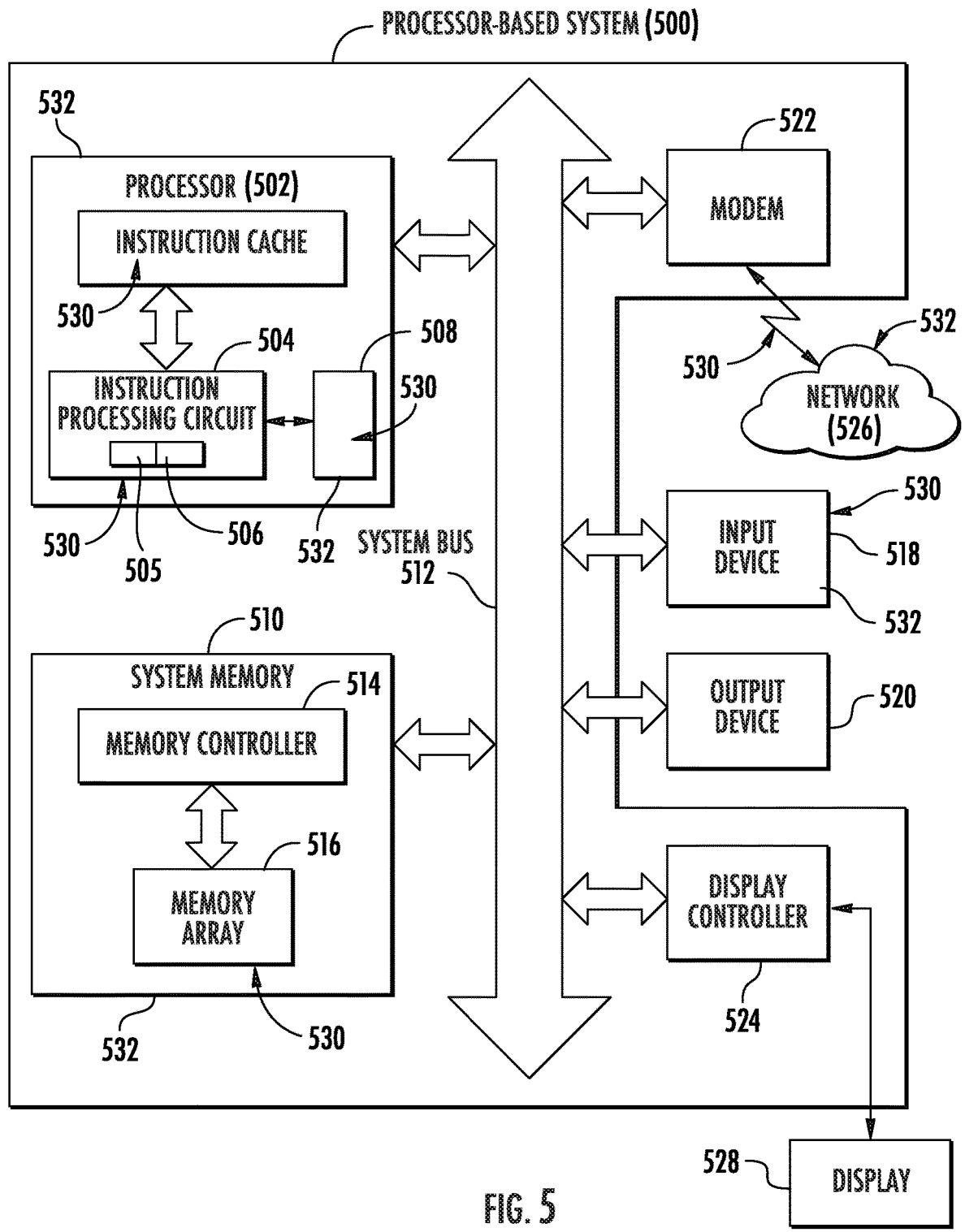

FIG. 3 is a diagram of another exemplary processor-based system that includes a processor with an instruction processing circuit that includes one or more instruction pipelines for processing computer instructions, wherein the instruction processing circuit is configured to reuse a captured, fetched instruction in the instruction pipeline to be processed in response to a pipeline flush caused by execution of the captured PDI, to avoid the need to re-fetch the PDI and its younger instructions to be processed;

FIG. 4 is a diagram of an exemplary pipeline fetch fill circuit in FIG. 3 configured to store captured, fetched instructions present in an instruction pipeline, and configured to provide captured fetched PDIs and/or their fetched younger instructions for reuse in response to a flush event caused by execution of the PDI; and FIG. 5 is a block diagram of an exemplary processor-based system that includes a processor with an instruction processing circuit configured to reuse a captured, fetched instruction in the instruction pipeline to be processed in response to a pipeline flush caused by execution of the captured PDI, to avoid the need to re-fetch the captured, fetched instructions to be processed, including but not limited to the exemplary instruction processing circuits in FIGS. 1 and 3 and according to, but not limited to, the exemplary processes in FIGS. 2A and 2B.

DETAILED DESCRIPTION

Exemplary aspects disclosed herein include reusing fetched, flushed instructions after an instruction pipeline flush in response to a hazard in a processor to reduce instruction re-fetching. The processor includes an instruction processing circuit that is configured to fetch instructions into an instruction pipeline to be processed and executed in an execution stage as part of instruction pipelining. The execution circuit in the instruction processing circuit is configured to generate a precise interrupt in response to encountering a hazard (e.g., a structural or control flow hazard) when executing an instruction. For example, the precise interrupt may have been generated as a result of a mispredicted conditional branch instruction wherein successor, control dependent instructions on the conditional branch instruction from an incorrect instruction flow path are already fetched into the instruction pipeline. In response the precise interrupt, the instruction processing circuit is configured to flush the instruction that caused the precise interrupt and its successor, younger instructions in the instruction pipeline to overcome the hazard. This results in a reduced instruction throughput in the instruction pipeline. If these already fetched instructions can be reused in the instruction pipelining after flushing without having to be re-fetched, these already fetched instructions can be injected into in the instruction pipeline without the need to re-fetch these instructions, thus mitigating the decreased instruction from flushing.

In this regard, in exemplary aspects disclosed herein, the instruction processing circuit in the processor is configured to detect fetched instructions in a pre-execution stage in an instruction pipeline that may cause a precise interrupt that would cause flushing of an instruction pipeline. These instructions can be referred to as performance degrading instructions (PDIs). For example, the instruction processing circuit may be configured to detect PDIs after being decoded in a decoding stage of the instruction pipeline. In response to detecting a PDI in the instruction pipeline, the instruction processing circuit is configured to capture the fetched PDI (if not already present) as well as successor, younger fetched instructions that are processed in the instruction pipeline behind the PDI, in a pipeline fetch refill circuit. Thus, if an execution of the PDI in the instruction pipeline causes a precise interrupt to occur that causes a flush of the instruction pipeline (a flush event), the instruction processing circuit can then determine if a detected instruction (i.e., a PDI and/or a successor instruction) is present in the pipeline fetch refill circuit as having been previously captured. If the detected instruction present in the pipeline fetch refill circuit, the instruction processing circuit can inject the detected instruction and its successor, younger instructions that were previously captured in the pipeline fetch refill circuit into the instruction pipeline to be processed without such instructions having to be re-fetched. Thus, the latency associated with re-fetching these instructions would not be incurred in the instruction throughput of the instruction pipeline. The instruction processing circuit can provide the "fall-through" program counter (PC) to the fetch stage in the instruction pipeline to know where to begin re-fetching instructions that have to be fetched in response to the flush event, because they cannot be injected from the pipeline fetch refill circuit. The fall-through PC is the PC of the next instruction following the last captured younger instruction in the pipeline fetch refill circuit. The instruction processing circuit can be configured to capture the fall-through PC in the pipeline fetch refill circuit associated with a captured PDI.

In this regard, FIG. 1 is a schematic diagram of an exemplary processor-based system 100 that includes a processor 102. As will be discussed in more detail below, the processor 102 is configured to reuse fetched instructions that were fetched and present in an instruction pipeline, and were subsequently flushed in response to an encountered hazard to reduce instruction re-fetching. Before discussing the reuse of fetched instructions in response to a pipeline flush that occurs in response to an encountered hazard, other components of the processor 102 are first discussed below.

With reference to FIG. 1, the processor 102 includes an instruction processing circuit 104 that includes one or more instruction pipelines $I_0$-$I_N$ for processing computer instructions for execution. The processor 102 is an out-of-order processor (OoP) shown in FIG. 1, but could also be an in-order processor. The instruction processing circuit 104 includes an instruction fetch circuit 106 that is configured to fetch instructions 108 from an instruction memory 110. The instruction memory 110 may be provided in or as part of a system memory in the processor-based system 100 as an example. An instruction cache 112 may also be provided in the processor 102 to cache the instructions 108 fetched from the instruction memory 110 to reduce timing delay in the instruction fetch circuit 106. The instruction fetch circuit 106 in this example is configured to provide the instructions 108 as fetched instructions 108F into the one or more instruction pipelines $I_0$-$I_N$ as an instruction stream 114 in the instruction processing circuit 104 to be pre-processed, before the fetched instructions 108F reach an execution circuit 116 to be executed as executed instructions 108E. The instruction pipelines $I_0$-$I_N$ are provided across different processing circuits or stages of the instruction processing circuit 104 to pre-process and process the fetched instructions 112F in a series of steps that can be performed concurrently to increase throughput prior to execution of the fetched instructions 108F by the execution circuit 116.

A control flow prediction circuit 118 (e.g., a control flow prediction circuit) is also provided in the instruction processing circuit 104 in the processor 102 in FIG. 1 to speculate or predict the outcome of a predicate of a fetched conditional control instruction 108F, such as a conditional branch instruction, that affects the instruction control flow path of the instruction stream 114 processed in the instruction pipelines $I_0$-$I_N$. The prediction of the control flow prediction circuit 118 can be used by the instruction fetch circuit 106 to determine the next fetched instructions 108F to fetch based on the predicted branch target address. The instruction processing circuit 104 also includes an instruction decode circuit 120 configured to decode the fetched instructions 108F fetched by the instruction fetch circuit 106 into decoded instructions 108D to determine the instruction type and actions required. The instruction type and action required encoded in the decoded instruction 108D may also be used to determine in which instruction pipeline $I_0$-$I_N$ the decoded instructions 108D should be placed.

In this example, the decoded instructions 108D are placed in one or more of the instruction pipelines $I_0$-$I_N$ and are next provided to a rename circuit 122 in the instruction processing circuit 104. The rename circuit 122 is configured to determine if any register names in the decoded instructions 108D need to be renamed to break any register dependencies that would prevent parallel or out-of-order processing. The rename circuit 122 is configured to call upon a renaming access table circuit 124 to rename a logical source register operand and/or write a destination register operand of a decoded instruction 108D to available physical registers $P_0$, $P_1$, ..., $P_X$ in a physical register file (PRf) 126. The renaming access table circuit 124 contains a plurality of register mapping entries 128(0)-128(P) each mapped to (i.e., associated with) a respective logical register $R_0$-$R_P$. The register mapping entries 128(0)-128(P) are each configured to store respective mapping information for corresponding to the logical registers $R_0$-$R_P$ pointing to a physical register $P_0$-$P_X$ in the PRF 126. Each physical register $P_0$-$P_X$ is configured to store a data entry 130(0)-130(X) for the source and/or destination register operand of a decoded instruction 108D.

The instruction processing circuit 104 in the processor 102 in FIG. 1 also includes a register access circuit 132 located in the instruction pipelines $I_0$-$I_N$ prior to an issue circuit 134. The register access circuit 132 is configured to access a physical register $P_0$-$P_X$ in the PRF 126 based on a register mapping entry 128(0)-128(P) mapped to a logical register $R_0$-$R_P$ in the renaming access table circuit 124 to use as an input value for a named source register operand of a decoded instruction 108D to be executed in the execution circuit 116. The issue circuit 134 is configured to store decoded instructions 108D in reservation entries in the instruction pipeline $I_0$-$I_N$ until all their respective source register operands are available for consumption in execution. The issue circuit 134 issues decoded instructions 108D ready to be executed to the execution circuit 116. A commit circuit 136 is also provided in the instruction processing circuit 104 to commit or write-back produced values generated by execution of decoded instructions 108D to memory, such as the PRF 126, cache memory, or system memory.

The execution circuit 116 in the instruction processing circuit 104 in the processor 102 in FIG. 1 is configured to generate a precise interrupt in response to encountering a hazard (e.g., a structural or control flow hazard) when executing a decoded instruction 108D. Instructions 108D that when executed, cause or are determined to likely cause a hazard in the processor 102, are referred to herein as "performance degrading instructions (PDIs)." By the time the execution circuit 116 encounters the hazard from executing a PDI 108D, successor, younger instructions 108D have been already fetched into an instruction pipeline $I_0$-$I_N$ and potentially decoded to be processed. In response to the precise interrupt, the instruction processing circuit 104 is configured to generate a flush event 138 to cause the instruction 108D that caused the precise interrupt as well as its successor, younger instructions 108D already fetched in the instruction pipelines $I_0$-$I_N$ to be flushed and re-executed to overcome the hazard. Re-fetching of the PDI 108D and its younger, successor instructions 108D reduces throughput in the instruction processing circuit 104 in an undesired manner.

To avoid the need to re-fetch flushed instructions 108D that were flushed by the instruction processing circuit 104, the instruction processing circuit 104 in the example in FIG. 1 includes a PDI detection circuit 140 and an instruction fetch reuse circuit 142. The PDI detection circuit 140 and instruction fetch reuse circuit 142 can be included as part of the instruction processing circuit 104 or outside of the instruction processing circuit 104. The PDI detection circuit 140 and instruction fetch reuse circuit 142 are both coupled to the instruction pipelines $I_0$-$I_N$. As will be discussed in more detail below, the PDI detection circuit 140 is configured to detect PaIs among the fetched instructions 108D that have been fetched into an instruction pipeline $I_0$-$I_N$ to be processed and executed. For example, the PDI detection circuit 140 may be configured to detect PDIs 108D after being decoded in the instruction decode circuit 120. In response to the PDI detection circuit 140 detecting a PDI 108D in an instruction pipeline $I_0$-$I_N$, the PDI detection circuit 140 is configured to capture detected instructions, which may be detected PDI 108D and/or its successor, younger fetched instructions 108D, that are processed in the instruction pipeline $I_0$-$I_N$ behind the PDI 108D into a pipeline fetch refill circuit 144. The pipeline fetch refill circuit 144 can be a table circuit that includes a plurality of fetch refill entries 146(0)-146(R) each configured to store information about the detected PDI 108D and the successor, younger fetched instructions 108D. Thus later, in response to a flush event 138, the instruction fetch reuse circuit 142 can determine if the detected instruction (i.e., the PDI 108D whose execution caused the flush event 138 and/or its younger, successor instructions 108D) were previously captured in a fetch refill entry 146(0)-146(R) in the pipeline fetch refill circuit 144. If the detected instruction 108D is present in a fetch refill entry 146(0)-146(R) in the pipeline fetch refill circuit 144, the instruction fetch reuse circuit 142 can inject the previously captured PDI 108D and/or its younger, successor fetched instructions 108D from the pipeline fetch refill circuit 144, into the instruction pipeline $I_0$-$I_N$ to be processed without such decoded instructions 108D having to be re-fetched.

Thus, the latency associated with re-fetching these previously fetched instructions 108D would not be incurred in the instruction throughput of the instruction processing circuit 104. The instruction fetch reuse circuit 142 can provide a "fall-through" program counter (PC) 148 to the instruction fetch circuit 106 so that the instruction fetch circuit 106 knows where to begin fetching instructions 108 in response to the flush event 138. The fall-through PC 148 is the PC of the next instruction 108D following the last previously captured, successor, younger instruction 108D for the PDI 108D whose execution caused the flush event 138 in the pipeline fetch refill circuit 144. As discussed in more detail below, the PDI detection circuit 140 is also configured to record the fall-through PC 148 in a fetch refill entry 146(0)-146(R) that is allocated to capture a detected fetched PDI 108D in the instruction pipeline $I_0$-$I_N$ and its younger, successor fetched instructions 108D In this manner, the instruction fetch circuit 106 can begin to fetch new instructions 108D that will not be injected by the instruction fetch reuse circuit 142 into the instruction pipeline $I_0$-$I_N$.

FIG. 2A is a flowchart illustrating an exemplary process 200 of the instruction processing circuit 104 in FIG. 1 detecting and capturing a fetched PDI 108D and fetched, younger instructions 108D in the instruction pipeline $I_0$-$I_N$ into the pipeline fetch refill circuit 144 in FIG. 1. This is so that later, in response to a flush event 138, the captured fetched PDI 108D and its fetched, younger instructions 108D can be reused and injected by the instruction fetch reuse circuit 142 into the instruction pipeline ($I_0$-$I_N$) without having to be re-fetched. The process 200 in FIG. 2A is discussed below in conjunction with the processor 102 in FIG. 1.

In this regard, the process 200 includes fetching a plurality of instructions 108 as a plurality of fetched instructions 108F from a program code into an instruction pipeline $I_0$-$I_N$ to be executed (block 202 in FIG. 2A). The process 200 also includes the PDI detection circuit 140 detecting if a fetched instruction 108D in the instruction pipeline $I^0$-$I_N$ is a PDI 108D (block 204 in FIG. 2A). There are a number of ways that the PDI detection circuit 140 can detect if the fetched instruction 108D in the instruction pipeline $I_0$-$I_N$ is a PDI 108D, examples of which are discussed in more detail below. The PDI detection circuit 140 then optionally determines if the detected instruction 108D was previously captured in the pipeline fetch refill circuit 144 so that it can be determined whether the PDI 108D and its younger, successor fetched instructions 108D have already been captured previously.

In one example, the instruction processing circuit 104 is configured to capture fetched PDI 108D itself in the pipeline fetch refill circuit 144 in response to the detected PDI 108D, if the PDI 108D is a type of instruction that would also be flushed in response to a flush event 138 and thus would need to be re-fetched. This is so that this captured fetched PDI 108 can also be later reused by the instruction fetch reuse circuit 142 as a re-fetched PDI 108, such as in response to a flush event 138, without the need for re-fetching the PDI 108. An example of a PDI 108 that is flushed and thus re-fetched for re-execution in response to a flush event 138 is a memory load instruction that encountered a deadlock. In another example, the instruction processing circuit 104 is not configured to capture the fetched PDI 108D in the pipeline fetch refill circuit 144 in response to the detected PDI 108D if the PDI 108D is a type of instruction that would not be flushed in response to a flush event 138 and thus would need to be re-fetched. This is because the captured fetched PDI does not need to be re-executed. An example of a PDI 108 that is not flushed and thus not re-fetched for re-execution in response to a flush event 138 is a conditional branch instruction that was mispredicted.

With reference back to FIG. 2A, in this example, in response to the PDI detection circuit 140 detecting the fetched instruction 108D as a detected instruction, which can be a PDI 108D and/or a younger, successor instruction 108D of the PDI (block 204 in FIG. 2A), the PDI detection circuit 140 determines if a source identification 150 (e.g., a source address, a program counter (PC)) of the detected instruction 108D matches a source identification (e.g., a source address, PC) in a refill tag 152(0)-152(R) in a fetch refill entry 146(0)-146(R) in the pipeline fetch refill circuit 144 (block 206 in FIG. 2A). This is to determine if the detected instruction 108D has already been previously captured in the pipeline fetch refill circuit 144 by the PDI detection circuit 140. In response to the source identification 150 of the detected instruction 108D not matching a source identification in a refill tag 152(0)-152(R) in a fetch refill entry 146(0)-146(R) (block 208 in FIG. 2A), the PDI detection circuit 140 allocates an available fetch refill entry 146(0)-146(R) among the plurality of fetch refill entries 146(0)-146(R) in the pipeline fetch refill circuit 144 to capture one or more successor, younger instructions 108D following the detected instruction 108D for later reuse (block 210 in FIG. 2A). As discussed above, if the detected instruction 108D is an instruction that will be re-fetched in response to a flush event 138, the PDI detection circuit 140 also captures the detected PDI 108D in the available fetch refill entry 146(0)-146'R), The PDI detection circuit 140 then stores the source identification 150 of the detected instruction 108D, which is detected PDI 108D and/or its younger, successor instruction 108D, in the refill tag 152 (0)-152(R) of the available fetch refill entry 146(0)-146(R) (block 212 in FIG. 2A). The PDI detection circuit 140 then captures one or more successor, younger fetched instructions 108D following the detected instruction 108D in the instruction pipeline $I_0$-$I_N$, in the allocated fetch refill entry 146(0)-146(R) in the pipeline fetch refill circuit 144 (block 214 in FIG. 2A). The detected instruction 108D and its successor, younger fetched instructions 108D are then processed and executed in the execution circuit 116 (block 216 in FIG. 2A).

FIG. 2B is a flowchart illustrating an exemplary process 220 of the instruction fetch reuse circuit 142 in FIG. 1 reusing a fetched instruction, which may be the PDI 108D and/or fetched, successor, younger instructions 108D, previously captured by the PDI detection circuit 140 in the pipeline fetch refill circuit 144, into the instruction pipeline $I_0$-$I_N$, in response to the flush event 138. As discussed above, if the PDI 108D whose execution caused the flush event 138 was previously captured, the captured, fetched PDI 108D and/or the fetched, successor, younger instructions 108D can be obtained from the pipeline fetch refill circuit 144 to be injected into instruction pipeline $I_0$-$I_N$. This avoids the need to re-fetch these instructions 108D into the instruction pipeline $I_0$-$I_N$. The process 220 in FIG. 2B is discussed below in conjunction with the processor 102 in FIG. 1.

In this regard, the process 220 includes the processor 102 generating a pipeline flush event 138 to flush the instruction pipeline $I_0$-$I_N$ in response to the executing of an instruction 108D among the plurality of instructions 108D generating a hazard as a PDT 108D (block 222 in FIG. 2B). in response to the pipeline flush event 138 (block 224 in FIG. 2B), the instruction fetch reuse circuit 142 determines if a source identification 150 of the fetched instruction 108D matches a source identification in a refill tag 152(0)-152(R) in a fetch refill entry 146(0)-146(R) as a matching fetch refill entry 146(0)-146(R) of the pipeline fetch refill circuit 144 (block 226 in FIG. 2B). In response to the source identification 150 of the fetched instruction 108D matching the source identification in the refill tag 152(0)-152(R) of the matching fetch refill entry 146(0)-146(R), the instruction fetch reuse circuit 142 inserts one or more captured fetched instructions 108D in the matching fetch refill entry 146(0)-146(R) into the instruction pipeline $I_0$-$I_N$ as fetched instructions 108D to be executed, in response to the source identification 150 of the fetched instruction 108D matching the source identification in the refill tag 152(0)-152(R) of the matching fetch refill entry 146(0)-146(R) (block 228 in FIG. 2B). The process 220 then includes executing the re-used fetched instructions 108D injected into the instruction pipeline $I_0$-$I_N$ (block 230 in FIG. 2B).

There are different options and features that can be provided in the instruction processing circuit 104 to support reuse of captured, detected instructions in an instruction pipeline in response to a pipeline flush caused by execution of the captured PDI, to avoid the need to re-fetch the PDI and its younger instructions to be processed. In this regard, FIG. 3 is diagram of another exemplary processor-based system 300 that includes a processor 302 with an instruction processing circuit 304 that is similar to the instruction processing circuit 104 in FIG. 1. Common circuits and components between the instruction processing circuit 104 in FIG. 1 and the instruction processing circuit 304 in FIG. 3 are shown with common element numbers and are not re-described.

As shown in FIG. 3, the instruction processing circuit 304 includes a PDI detection circuit 340 that is similar to the PDI detection circuit 140 in FIG. 1. The instruction processing circuit 304 in FIG. 3 also includes an instruction fetch reuse circuit 342 that is similar to the instruction fetch reuse circuit 142 in FIG. 1. The PDI detection circuit 340 is configured to detect PDIs 108D among the fetched instructions 108D that have been fetched into an instruction pipeline $I_0$-$I_N$ to be processed and executed. For example, the PDI detection circuit 340 may be configured to detect PDIs 108D after being decoded in the instruction decode circuit 120. The PDI detection circuit 340 in the example in FIG. 3 is coupled to the instruction pipelines $I_0$-$I_N$ between the instruction decode circuit 120 and the rename circuit 122 in an in-order stage of the instruction pipelines $I^0$-$I_N$ so that the PDI detection circuit 340 can receive decoded information about decoded instructions 108D to detect a decoded PDI 108D. The PDI detection circuit 340 in this example is configured to receive decoded instructions 108D in an in-order stage of the instruction pipelines $I_0$-$1_N$, so that if the decoded instruction 108D is detected as a PDI 108D, the PDI detection circuit 340 can be configured to capture subsequent decoded instructions 108D in the instruction pipelines $I_0$-$I_N$ that are known to follow the detected PDI 108D in the program code from which the instruction stream 114 was fetched from.

There are different ways that the PDI detection circuit 340 can detect if a fetched instruction 108F or a decoded instruction 108D is a PDI. In one example, if the decoded instruction 108D is a branch instruction that has a branch behavior that is resolved at execution, such as a conditional branch instruction, indirect branch instruction, or conditional, indirect branch instruction, the PDI detection circuit 340 can be configured to use a branch predictor confidence 354 updated by the control flow prediction circuit 118. The branch predictor confidence 354 is a measure of the confidence that a branch behavior of branch instruction can be correctly predicted. The control flow prediction circuit 118 may be configured to predict a branch behavior of the branch instruction 108D, and update the branch predictor confidence 354 based on whether the predicted branch behavior matches a resolution of the branch behavior determined by the execution circuit 116 when the branch instruction 108D was previously executed in the past. Thus, the PDI detection circuit 340 can use the branch predictor confidence 354 to predict or determine if a branch instruction 108D is a PDI. Branch instructions 108D that have a low branch predictor confidence 354 are more likely to be mispredicted and thus more likely to cause a hazard when executed in the execution circuit 116 that causes a flush event 138 to be generated.

The PDI detection circuit 340 can also be configured to determine if a memory operation instruction 108D, such as a load instruction, is a PDI. The memory operation instruction 108D involves performing a memory operation at a specified memory address, which may be a direct memory address or an indirect memory address. The execution circuit 116 can be configured to store a PDI indicator corresponding to a memory operation instruction 108D when a hazard occurs when the memory operation instruction 108D is executed and a flush event 138 occurs. The execution circuit 116 may be configured to store the PDI indicator in a PDI indicator circuit 358 that contains a plurality of PDI indicator entries 360(0)-360(I) in which a PDI indicator can be stored corresponding to a memory operation instruction. When the PDI detection circuit 340 receives a memory operation instruction 108D to determine if it is a PDI, the PDI detection circuit 340 can consult the PDI indicator circuit 358 to determine if a PDI indicator is present in a PDI indicator entry 360(0)-360(I) for the memory operation instruction 108D. The PDI detection circuit 340 can use the PDI indicator to determine if the corresponding memory operation instruction 108D should be considered a PDI for PDI detection purposes.

With continuing reference to FIG. 3, in response to the PDI detection circuit 340 detecting a received instruction 108D in an instruction pipeline $I_0$-$I_N$ as a PDI, the PDI detection circuit 340 is configured to capture the fetched PDI 108D and/or its successor, younger fetched instructions 108D that follow the fetched PDI 108D instruction pipeline $I_0$-$I_N$ in a pipeline fetch refill circuit 344. As discussed below, this allows the instruction fetch reuse circuit 342 to obtain these fetched instructions 108D to be reused and injected into the instruction pipeline $I_0$-$I_N$ in response to a flush event 138 generated by later execution of the detected PDI 108D. The pipeline fetch refill circuit 344 can be a memory table circuit that includes a plurality of fetch refill entries 346(0)-346(R) each configured to store information about the detected PDI 108D and the successor, younger fetched instructions 108D. A more detailed example of the pipeline fetch refill circuit 344 in FIG. 3 is illustrated in FIG. 4 and discussed below.

FIG. 4 is a diagram of the exemplary pipeline fetch refill circuit 344 in FIG. 3 configured to store captured fetched PDIs 108D and their fetched younger instructions present in the instruction pipeline $I_0$-$I_N$ in the processor 302 in FIG. 3.

The pipeline fetch refill circuit 344 includes a plurality of fetch refill entries 346(0)-346(R) that are each configured to be allocated to store a PDI 108D detected by the PDI detection circuit 340 for later reuse by the instruction fetch reuse circuit 342. The pipeline fetch refill circuit 344 will be discussed in conjunction with discussing exemplary operation of the PDI detection circuit 340 in FIG. 3.

In this regard, when the PDI detection circuit 340 detects a received decoded instruction 108D being processed in the instruction pipeline $I_0$-$I_N$ as a PDI as discussed above, the PDI detection circuit 340 can first determine if a fetch refill entry 346(0)-346(R) in the pipeline fetch refill circuit 344 has already been allocated and is storing the PDI 108D, If so, there is no need to reallocate another fetch refill entry 346(0)-346(R) for the detected PDI 108D. In this example, to determine if a fetch refill entry 346(0)-346(R) in the pipeline fetch refill circuit 344 has already been allocated and is storing the PDI 108D, the PDI detection circuit 340 is configured to determine if a source identification 350 of the detected instruction (i.e., the PDI 108D and/or its younger, successor instruction 108D) in FIG. 3 matches a source identification 362(0)-362(R) in a respective refill tag 352(0)-352(R) in a fetch refill entry 346(0)-346(R) in the pipeline fetch refill circuit 344. The source identification 350 of the detected instruction 108D can be the program counter (PC) of the detected instruction 108D, which uniquely identifies its presence in a program code from which it was fetched into the instruction stream 114 of the instruction processing circuit 304. If the source identification 350 of the detected instruction 108D is contained in a source identification 362(0)-362(R) in a respective refill tag 352(0)-352(R) in a fetch refill entry 346(0)-346(R) in the pipeline fetch refill circuit 344, this means that the PDI 108D and/or its successor, younger instructions 108D are already stored in the fetch refill entry 346(0)-346(R) which included the respective refill tag 352(0)-352(R) having the matching source identification 362(0)-362(R). The PDI detection circuit 340 does not need to further process the detected instruction 108D.

However, if the source identification 350 of the detected instruction 108D is not contained in a source identification 362(0)-362(R) in a respective refill tag 352(0)-352(R) in a fetch refill entry 346(0)-346(R) in the pipeline fetch refill circuit 344, the PDI detection circuit 340 is configured to process the detected PDI 108D. The PDI detection circuit 340 is configured to allocate an available fetch refill entry 346(0)-346(R) in the pipeline fetch refill circuit 344 to store the source identification 350 of the detected instruction 108D for later identification by the instruction fetch reuse circuit 342 discussed in more detail below. The PDI detection circuit 340 is also configured to store the source identification 350 of the detected instruction 108D in the source identification 362(0)-362(R) in the allocated fetch refill entry 346(0)-346(R) 346(R) in the pipeline fetch refill circuit 344. If the detected PDI 108D is a branch instruction that has a branch instruction flow path that may be predicted, but is not resolved until execution in the execution circuit 116, the PDI detection circuit 340 can also be configured to store a refill path 364 of the branch instruction 108D (e.g., taken or not taken for a conditional branch instruction) received from the instruction pipeline $I_0$-$I_N$ in a refill path 366(0)-366(R) in the respective allocated fetch refill entry 346(0)-346(R) in the pipeline fetch refill circuit 344. This will allow the instruction fetch reuse circuit 342 to know whether the captured successor instructions 108D in the pipeline fetch refill circuit 344 for a branch instruction 108E that caused a flush event 138 should be reused as being in the correct instruction flow path from the branch instruction 108E. The PDI detection circuit 340 in FIG. 3 is then configured to set a valid indicator 368(0)-368(R) for the corresponding allocated fetch refill entry 346(0)-346(R) in the pipeline fetch refill circuit 344 in FIG. 4 to a valid state so that the instruction fetch reuse circuit 342 will know it is valid to consult a matching fetch refill entry 346(0)-346(R) to reuse previously fetched and captured instructions 108D in the fetch refill entry 346(0)-346(R) corresponding to a PDI 108E that caused a flush event 138.

The PDI detection circuit 340 is then configured to capture information about the successor, younger instructions 108D in the instruction pipeline $I_0$-$I_N$ that follow a detected PDI 108D in the allocated fetch refill entry 346(0)-346(R) in the pipeline fetch refill circuit 344 in FIG. 4 for later possible reuse. In this regard, the PDI detection circuit 340 is configured to store received subsequent, successor, younger instructions 108D that follow the detected PDI 108D as captured instructions 372(1)-372(X) in the allocated fetch refill entry 346(0)-346(R). For example, fetch refill entry 346(0) can be configured to store up to 'X' subsequent, successor, younger instructions 108D as captured instructions 372(0)(1)-372(0)(X). The PDI detection circuit 340 is also configured to capture metadata 374(1)-374(X) for each of the respective captured instructions 372(1)-372(X) following a detected PDI 108D as information that can be used to assist in the processing of the captured instructions 372(1)-372(X) if reused and reinjected into the instruction pipeline $I_0$-$I_N$ by the instruction fetch reuse circuit 342. For example, fetch refill entry 346(0) can store up to 'X' metadata for 'X' captured instructions 108D as metadata 374(0)(1)-374(0)(X). The metadata 374(1)-374(X) can include information that indicates whether certain instruction pipelines $I_0$-$I_N$ can be skipped if the corresponding captured instruction 372(l)-372(X) is reused at a later time in response to its corresponding PDI 108E causing a flush event 138 to occur. For example, the direction of conditional branches within the captured instruction 372(1)-372(X) can be stored as metadata. 374(1)-374(X).

The PDI detection circuit 340 is also configured to store a fall-through source address (e.g., a PC) 370(0)-370(X) in a respective allocated fetch refill entry 346(0)-346(R), This is so that the instruction fetch reuse circuit 342 can use such information to inform the instruction fetch circuit 106 in FIG. 3 to where to start fetching new instructions 108 in response to reuse of captured instructions 372(1)-372(X) for a PDI 108D that whose execution caused a flush event 138. In this regard, the PDI detection circuit 340 can be configured to store the PC following the last captured instruction 372(0)-372(X) captured in a respective fetch refill entry 346(0)-346(R) for a detected PDI 108D in the respective fall-through source address 370(0)-370(R). The PDI detection circuit 340 can be configured to stop capturing subsequent, successor, younger instructions 108D after a detected PDI 108D in captured instructions 372(0)-372(X) in a fetch refill entry 346(0)-346(R) for the detected PDI 108D when a next PDI 108D is encountered by the PDI detection circuit 340 in the instruction stream 114 as an example. As another example, the PDI detection circuit 340 can be configured to stop capturing subsequent, successor, younger instructions 108D after a detected PDI 108D in captured instructions 372(0)-372(X) in a fetch refill entry 346(0)-346(R) for the detected PDI 108D once the pipeline fetch refill circuit 344 is full. Or, the PDI detection circuit 340 can be configured to stop capturing subsequent, successor, younger instructions 108D when a next PDI 108D is encountered or the pipeline fetch refill circuit 344 is full, whichever occurs first as another example.

Each fetch refill entry 346(0)-346(R) in pipeline fetch refill circuit 344 in FIG. 4 can also be configured to store a respective useful indicator 376(0)-376(X). As will be discussed in more detail below, the useful indicator 376(0)-376(X) is configured to store a usefulness indicating how useful the fetch refill entry 346(0)-346(R) is. Usefulness stored in the useful indicator 376(0)-376(X) is a measure of how likely the PDI 108D associated with a respective fetch refill entry 346(0)-346(R) will be used by the instruction fetch reuse circuit 342 to reuse the fetched instructions 108D captured in the fetch refill entry 346(0)-346(R). The usefulness may be a count value and the useful indicator 376(0)-376(X) may be a counter as an example. The useful indicator 376(0)-376(X) can allow a separate process to update and monitor the usefulness stored in the useful indicator 376(0)-376(X) as a way to control deallocation of fetch refill entries 346(0)-346(R) to make room for future detected PDIs 108D and their associated successor instructions 108D to be captured for later reuse.

With reference back to FIG. 3, as discussed above, the instruction fetch reuse circuit 342 is configured to reuse previously captured instructions 108D in captured instructions 372(0)-372(X) in a fetch refill entry 346(0)-346(R) in the pipeline fetch refill circuit 344 corresponding to the executed PDI 108E whose execution caused a flush event 138 to occur. In this regard, in response to the flush event 138, the instruction fetch reuse circuit 342 is configured to determine a source identification 378 of a previously captured detected instruction (i.e., the PDI 108D and/or its younger, successor instructions 108D). For example, the source identification 378 of the detected instruction 108D may be a PC of the PDI 108D, The instruction fetch reuse circuit 342 can be configured to determine if the source identification 378 of the detected instruction 108D matches (i.e., a hit) a source identification 362(0)-326(R) in a corresponding refill tag 352(0)-352(R) in a corresponding fetch refill entry 346(0)-346(R) in the pipeline fetch refill circuit 344. If so, the instruction fetch reuse circuit 342 can be configured to access the captured instructions 372(1)-372(X) in a fetch refill entry 346(0)-346(R) whose source identification 362(0)-326(R) matched the source identification 378 of the detected instruction 108D, and inject those captured instructions 372(1)-372(X) in the instruction pipelines $I_0$-$I_N$ to be processed. In this manner, the captured instructions 372(1)-372(X) need not be re-fetched by the instruction fetch circuit 106. The instruction fetch reuse circuit 342 can be configured to inject the captured instructions 372(i)-372(X) after the instruction decode circuit 120, such as into the rename circuit 122 or a later stage in the instruction pipelines such as the execution circuit 116. The instruction fetch reuse circuit 342 is also configured to provide the fall-through source address 370(0)-370(X) of the matching fetch refill entry 346(0)-346(R) to the instruction fetch circuit 106. The instruction fetch circuit 106 can start fetching instructions 108 starting from the fall-through source address 370(0)-370(X) to avoid re-fetching the same instructions 108 as the captured instructions 372(1)-372(X) reused and injected into the instruction pipeline $I^0$-$I_N$.

If however, the instruction fetch reuse circuit 342 determines the source identification 378 of the detected instruction 108D whose execution caused the flush event 138 does not match (i.e., a miss) a source identification 362(0)-362(R) in a corresponding refill tag 352(0)-352(R) in a corresponding fetch refill entry 346(0)-346(R) in the pipeline fetch refill circuit 344, the instruction fetch reuse circuit 342 can ignore the detected instruction 108D. The instruction fetch circuit 106 will re-fetch the PDI 108D and/or its successor instructions 108D. The instruction fetch reuse circuit 342 may be configured to provide the fall-through source address 370 to the instruction fetch circuit 106 as the PC of the PDI 108E, so that the instruction fetch circuit 106 will re-fetch the PDI 108E and its successor instructions 108D.

The instruction fetch reuse circuit 342 can also be configured to confirm the refill path 366(0)-366(R) in the refill tag 352(0)-352(R) in the corresponding fetch refill entry 346(0)-346(R) in the pipeline fetch refill circuit 344 whose source identification 362(0)-362(R) matched the source identification 378 of the PDI 108D, before reusing the corresponding captured instructions 372(1)-372(X). This is so that for example, if the PDI 108D is a branch instruction that can take different instruction flow paths depending on the resolution of its execution, the instruction fetch reuse circuit 342 can ensure that the captured instructions 372(1)-372(X) in the matched fetch refill entry 346(0)-346(R) are from the same instruction flow path as resolved by execution of the PDI 108D. In this manner, the reuse of the captured instructions 372(1)-372(X) through their injection by the instruction fetch reuse circuit 342 in instruction pipelines $I_0$-$I_N$ will not be for an incorrect instruction flow path. If the captured instructions 372(1)-372(X) in a corresponding matched fetch refill entry 346(0)-346(R) are not for the correct instruction flow path according to its recorded refill path 366(0)-366(R), the instruction fetch reuse circuit 342 can choose to not reuse those captured instructions 372(1)-372(X) and instead let them be re-fetched by the instruction processing circuit 304. In this case, the instruction fetch reuse circuit 342 can be configured to provide the source identification 362(Q)-362(R) of the executed PDI 1.08E that caused the flush event 138 to the instruction processing circuit 304, which will then cause the PDI 108E and its subsequent, follow-on instructions 108D to be re-fetched.

As discussed above, it may be desirable to provide a mechanism to de-allocate fetch refill entries 346(0)-346(R) in the pipeline fetch refill circuit 344 to make room for capturing newer executed PDIs 108E that caused a flush event 138 and their successor instructions 108D for potential re-use. Some fetch refill entries 346(0)-346(R) in the pipeline fetch refill circuit 344 may be allocated to PaIs 108D and/or younger, successor instructions 108D that are not as useful (i.e., not as likely to occur in the future) as newer executed PDIs 108E that caused a flush event 138.

As discussed above, the instruction fetch reuse circuit 342 determines that the source identification 378 of the PDI 108D and/or its younger, successor instructions 108D is already contained in a valid fetch refill entry 346(0)-346(R) in the pipeline fetch refill circuit 344 (i.e., the source identification 378 matches a source identification 362(0)-362(R)). If the source identification 378 of the PDI 108D and/or its younger, successor instructions 108D is already contained in a valid fetch refill entry 346(0)-346(R), the instruction fetch reuse circuit 342 can be configured to increase the usefulness in the corresponding useful indicator 376(0)-376(X) in the corresponding fetch refill entry 346(0)-346(R). For example, if the useful indicator 376(0)-376(X) is a counter, the instruction fetch reuse circuit 342 can be configured to increment the useful indicator 376(0)-376(X) to signify an increased usefulness as an example. However, if the source identification 378 of the executed PDI 108E is not already contained in a valid fetch refill entry 346(0)-346(R), such that a new valid fetch refill entry 346(0)-346(R) needs to be allocated, the instruction fetch reuse circuit 342 could decrease the usefulness of all useful indicators 376(0)-376(X) equally in the corresponding fetch refill entry 346(0)-346(R) as one example. If the usefulness in a useful indicator 376(0)-376(X) of a fetch refill entry 346(0)-346(R) in the pipeline fetch refill circuit 344 falls below a set threshold usefulness, the instruction fetch reuse circuit 342 or other circuit could be configured to de-allocate such fetch refill entry 346(0)-346(R) to free such fetch refill entry 346(0)-346(R) to be re-allocated for a new PDI 108E.

Alternatively, instead of decreasing the usefulness of all useful indicators 376(0)-376(X) equally in the corresponding fetch refill entry 346(0)-346(R) right away in response to a miss to the pipeline fetch refill circuit 344, if a source identification 378 of the detected instruction 108D (i.e., 108D and/or its younger, successor instructions 108D) is not already contained in a valid fetch refill entry 346(0)-346(R), a global allocation fail indicator 380 in FIG. 3 could be incremented or increased. Then, once the global allocation fail indicator 380 exceeds a threshold global allocation, the usefulness of the useful indicators 376(0)-376(X) in each fetch refill entry 346(0)-346(R) can be decreased. This mechanism controls the rate of decrease in usefulness of the useful indicators 376(0)-376(X) in each fetch refill entry 346(0)-346(R) to not correspond on a per miss event basis to the pipeline fetch refill circuit 344. Again, if the usefulness in a useful indicator 376(0)-376(X) of a fetch refill entry 346(0)-346(R) in the pipeline fetch refill circuit 344 falls below a set threshold usefulness, the instruction fetch reuse circuit 342 or other circuit could be configured to de-allocate such fetch refill entry 346(0)-346(R) to free such fetch refill entry 346(0)-346(R) to be re-allocated for a new PDI 108D and/or its younger, successor instructions 108D.

As another alternative, the usefulness in the useful indicators 376(0)-376(X) of a fetch refill entry 346(0)-346(R) in the pipeline fetch refill circuit 344 could be decreased every so many instructions 108D processed in the instruction pipeline $I_0$-$I_N$. As another alternative, the usefulness in the useful indicators 376(0)-376(X) of a fetch refill entry 346(0)-346(R) in the pipeline fetch refill circuit 344 could be decreased every so many detected PDIs 108D by the PDI detection circuit 340. As another alternative, the usefulness in the useful indicators 376(0)-376(X) of a fetch refill entry 346(0)-346(R) in the pipeline fetch refill circuit 344 could be decreased every so many flush events 138.

FIG. 5 is a block diagram of an exemplary processor-based system 500 that includes a processor 502 (e.g., a microprocessor) that includes an instruction processing circuit 504 that includes a PDI detection circuit 505 and an instruction fetch reuse circuit 506 for detecting PDIs, capturing fetched instructions that are the PDI and/or its successor, younger instructions that follow the PDI, and reusing the captured instructions in response to a flush event caused by execution of a corresponding PDI. For example, the processor 502 in FIG. 5 could be the processor 102 in FIG. 1 or processor 302 in FIG. 3. As another example, the instruction processing circuit 504 could be the instruction processing circuit 104 in FIG. 1 or the instruction processing circuit 304 in FIG. 3. As another example, the PDI detection circuit 505 could be the PDI detection circuit 140 in FIG. 1 or the PDI detection circuit 340 in FIG. 3. As another example, the instruction fetch reuse circuit 506 could be the instruction fetch reuse circuit 142 in FIG. 1 or the instruction fetch reuse circuit 342 in FIG. 3.

The processor-based system 500 may be a circuit or circuits included in an electronic board card, such as a printed circuit board (PCB), a server, a personal computer, a desktop computer, a laptop computer, a personal digital assistant (PDA), a computing pad, a mobile device, or any other device, and may represent, for example, a server, or a user's computer. In this example, the processor-based system 500 includes the processor 502. The processor 502 represents one or more general-purpose purpose processing circuits, such as a microprocessor, central processing unit, or the like. More particularly, the processor 502 may be an EDGE instruction set microprocessor, or other processor implementing an instruction set that supports explicit consumer naming for communicating produced values resulting from execution of producer instructions. The processor 502 is configured to execute processing logic in instructions for performing the operations and steps discussed herein. In this example, the processor 502 includes an instruction cache 508 for temporary, fast access memory storage of instructions accessible by the instruction processing circuit 504. Fetched or pre-fetched instructions from a memory, such as from a system memory 510 over a system bus 512, are stored in the instruction cache 508. The instruction processing circuit 504 is configured to process instructions fetched into the instruction cache 508 and process the instructions for execution.

The processor 502 and the system memory 510 are coupled to the system bus 512 and can intercouple peripheral devices included in the processor-based system 500. As is well known, the processor 502 communicates with these other devices by exchanging address, control, and data information over the system bus 512. For example, the processor 502 can communicate bus transaction requests to a memory controller 514 in the system memory 510 as an example of a slave device. Although not illustrated in FIG. 5, multiple system buses 512 could be provided, wherein each system bus constitutes a different fabric. In this example, the memory controller 514 is configured to provide memory access requests to a memory array 516 in the system memory 510. The memory array 516 is comprised of an array of storage bit cells for storing data. The system memory 510 may be a read-only memory (ROM), flash memory, dynamic random access memory (DRAM), such as synchronous DRAM (SDRAM), etc., and a static memory (e.g., flash memory, static random access memory (SRAM), etc.), as non-limiting examples.

Other devices can be connected to the system bus 512. As illustrated in FIG. 5, these devices can include the system memory 510, one or more input device(s) 518, one or more output device(s) 520, a modem 522, and one or more display controllers 524, as examples. The input device(s) 518 can include any type of input device, including but not limited to input keys, switches, voice processors, etc. The output device(s) 520 can include any type of output device, including but not limited to audio, video, other visual indicators, etc. The modem 522 can be any device configured to allow exchange of data to and from a network 526. The network 526 can be any type of network, including but not limited to a wired or wireless network, a private or public network, a local area network (LAN), a wireless local area network (WLAN), a wide area network (WAN), a BLUETOOTH™ network, and the Internet. The modem 522 can be configured to support any type of communications protocol desired. The processor 502 may also be configured to access the display controller(s) 524 over the system bus 512 to control information sent to one or more displays 528. The display(s) 528 can include any type of display, including but not limited to a cathode ray tube (CRT), a liquid crystal display (LCD), a plasma display, etc.

The processor-based system 500 in FIG. 5 may include a set of instructions 530 to be executed by the processor 502 for any application desired according to the instructions. The instructions 530 may be stored in the system memory 510, processor 502, and/or instruction cache 508 as examples of a non-transitory computer-readable medium 532. The instructions 530 may also reside, completely or at least partially, within the system memory 510 and/or within the processor 502 during their execution. The instructions 530 may further be transmitted or received over the network 526 via the modem 522, such that the network 526 includes the computer-readable medium 532.

While the computer-readable medium 532 is shown in an exemplary embodiment to be a single medium, the term "computer-readable medium" should be taken to include a single medium or multiple media (e.g., a centralized or distributed database, and/or associated caches and servers) that stores the one or more sets of instructions. The term "computer-readable medium" shall also be taken to include any medium that is capable of storing, encoding, or carrying a set of instructions for execution by the processing device and that causes the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium)

having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or perfonned with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM. Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A processor, comprising:
an instruction processing circuit, comprising:
an instruction fetch circuit configured to fetch a plurality of instructions as a plurality of fetched instructions from a program code into an instruction pipeline to be executed; and
an execution circuit coupled to the instruction fetch circuit, the execution circuit configured to:
execute a fetched instruction among the plurality of fetched instructions in the instruction pipeline; and generate a pipeline flush event to flush the instruction pipeline in response to execution of a second fetched instruction among the plurality of instructions comprising a performance degrading instruction (PDI) generating a hazard;

a PDI detection circuit coupled to the instruction pipeline, the PDI detection circuit configured to:

detect if a third fetched instruction in the instruction pipeline is a PDI as an instruction determined to cause a hazard when executed by the execution circuit causing a precise interrupt to be generated; and in response to detecting the third fetched instruction as the PDI, the PDI detection circuit is further configured to:

allocate an available fetch refill entry among a plurality of fetch refill entries in a pipeline fetch refill circuit; and store a source identification of the third fetched instruction comprising one of a PDI and a successor instruction in a refill tag of the available fetch refill entry; and an instruction fetch reuse circuit coupled to the instruction pipeline, the instruction fetch reuse circuit configured to, in response to the pipeline flush event:

determine if a source identification of the fetched instruction matches a source identification in a refill tag in a fetch refill entry as a matching fetch refill entry among the plurality of fetch refill entries of the pipeline fetch refill circuit; and in response to the source identification of the fetched instruction matching the source identification in the refill tag in the fetch refill entry:

insert one or more captured instructions in the matching fetch refill entry into the instruction pipeline after the instruction fetch circuit to be processed.

2. The processor of claim 1, wherein the instruction processing circuit further comprises:

a decode circuit coupled to the instruction fetch circuit, the decode circuit configured to decode the plurality of fetched instructions into a plurality of decoded instructions;

the execution circuit configured to execute a decoded instruction among the plurality of decoded instructions in the instruction pipeline; and in response to the source identification of the fetched instruction matching the source identification in the refill tag in the fetch refill entry of the pipeline fetch refill circuit:

insert the one or more captured instructions in the matching fetch refill entry between the decode circuit and the execution circuit in the instruction pipeline to be processed.

3. The processor of claim 1, wherein, the instruction processing circuit is configured to, in response to the source identification of the fetched instruction matching the source identification in the refill tag in the fetch refill entry:

insert the one or more captured instructions in the matching fetch refill entry to the execution circuit in the instruction pipeline to be executed.

4. The processor of claim 1, wherein the instruction fetch reuse circuit is configured to, in response to the source identification of the PDI that is the third fetched instruction matching the source identification in the refill tag in the fetch refill entry:

determine if an instruction flow path of the PDI that is the third fetched instruction matches a refill path in the refill tag of the matching fetch refill entry; and in response to the instruction flow path of the PDI that is the third fetched instruction matching the refill path in the refill tag of the matching fetch refill entry:

insert the one or more captured instructions in the matching fetch refill entry into the instruction pipeline after the instruction fetch circuit to be processed.

5. The processor of claim 1, wherein:

the instruction fetch reuse circuit is further configured to, in response to the source identification of the fetched instruction matching the source identification in the refill tag in the fetch refill entry:

communicate a fall-through source address in the matching fetch refill entry to the instruction fetch circuit; and the instruction fetch circuit is configured to fetch instructions starting at the fall-through source address in response to receiving the fall-through source address.

6. The processor of claim 1, wherein:

the instruction fetch reuse circuit is further configured to, in response to the source identification of the fetched instruction matching the source identification in the refill tag in the fetch refill entry:

increase a usefulness in a useful indicator in the matching fetch refill entry in the pipeline fetch refill circuit indicating the usefulness of the matching fetch refill entry.

7. The processor of claim 6, wherein:

the instruction fetch reuse circuit is further configured to, in response to the source identification of the fetched instruction not matching the source identification in the refill tag in the fetch refill entry:

decrease a usefulness in a useful indicator in each of the plurality of fetch refill entries in the pipeline fetch refill circuit.

8. The processor of claim 7, wherein:

the instruction fetch reuse circuit is further configured to:

determine if the usefulness in the useful indicator in a second fetch refill entry among the plurality of fetch refill entries in the pipeline fetch refill circuit falls below a threshold usefulness; and in response to the usefulness in the useful indicator in the second fetch refill entry falling below the threshold usefulness, deallocate the second fetch refill entry in the pipeline fetch refill circuit.

9. The processor of claim 6, wherein:

the instruction fetch reuse circuit is further configured to, in response to the source identification of the fetched instruction not matching the source identification in the refill tag in the fetch refill entry, increase a global allocation in a global allocation fail indicator for the pipeline fetch refill circuit; and in response to the global allocation in the global allocation fail indicator exceeding a threshold global allocation, decrease a usefulness of a useful indicator in each fetch refill entry among the plurality of fetch refill entries in the pipeline fetch refill circuit.

10. The processor of claim 9, in response to the usefulness in the useful indicator in a second fetch refill entry among the plurality of fetch refill entries in the pipeline fetch refill circuit falling below a threshold usefulness, deallocate the second fetch refill entry in the pipeline fetch refill circuit.

11. The processor of claim 1, wherein in response to detecting the third fetched instruction as a PDI, the PDI detection circuit is further configured to:
  determine if the source identification of the third fetched instruction matches a source identification in a refill tag in a fetch refill entry among the plurality of fetch refill entries in the pipeline fetch refill circuit; and
  in response to the source identification of the third fetched instruction not matching a source identification in a refill tag in a fetch refill entry, the PDI detection circuit is configured to:
    allocate the available fetch refill entry among the plurality of fetch refill entries in the pipeline fetch refill circuit; and
    store the source identification of the third fetched instruction in the refill tag of the available fetch refill entry.

12. The processor of claim 1, wherein the PDI detection circuit is further configured to, in response to the source identification of the third fetched instruction not matching a source identification in a refill tag in a fetch refill entry:
  capture one or more successor instructions following the third fetched instruction in the instruction pipeline in the allocated available fetch refill entry in the pipeline fetch refill circuit.

13. The processor of claim 12, wherein:
  the plurality of instructions comprises a branch instruction;
  the instruction fetch circuit is configured to fetch the branch instruction into the instruction pipeline to be executed;
  the instruction processing circuit is configured to determine an instruction flow path of the branch instruction;
  the PDI detection circuit is configured to detect if the fetched branch instruction in the instruction pipeline is a PDI; and
  the PDI detection circuit is further configured to, in response to detecting the fetched branch instruction is a PDI and in response to a source identification of the fetched branch instruction detected as the PDI not matching a source identification in a refill tag in a fetch refill entry:
    store the instruction flow path of the detected PDI that is the fetched branch instruction in a refill path of the available fetch refill entry.

14. The processor of claim 12, wherein the PDI detection circuit is further configured to, in response to the source identification of the third fetched instruction not matching a source identification in a refill tag in a fetch refill entry:
  determine if a subsequent instruction among the one or more successor instructions is a PDI; and
  in response to the determining the subsequent instruction is a PDI:
    not capture the subsequent instruction as the one or more successor instructions determined to be a PDI in the instruction pipeline in the allocated available fetch refill entry in the pipeline fetch refill circuit.

15. The processor of claim 14, wherein the PDI detection circuit is further configured to, in response to determining the subsequent instruction is a PDI:
  store a source identification of the subsequent instruction determined to be a PDI as a fall-through source address in an allocated fetch refill entry in the pipeline fetch refill circuit.

16. The processor of claim 13, wherein the PDI detection circuit is further configured to, in response to the source identification of the third fetched instruction not matching a source identification in a refill tag in a fetch refill entry:
  determine if the pipeline fetch refill circuit is full; and
  in response to the determining the pipeline fetch refill circuit is full:
    not capture a subsequent instruction among the one or more successor instructions in the instruction pipeline in the allocated available fetch refill entry in the pipeline fetch refill circuit.

17. The processor of claim 16, wherein the PDI detection circuit is further configured to:
  store a source identification of the subsequent instruction among the one or more successor instructions not captured in the allocated available fetch refill entry in the pipeline fetch refill circuit as a fall-through source address in the allocated available fetch refill entry in the pipeline fetch refill circuit.

18. The processor of claim 1, wherein the PDI detection circuit is further configured to, in response to the source identification of the third fetched instruction not matching a source identification in a refill tag in a fetch refill entry:
  increase a global allocation in a global allocation fail indicator for the pipeline fetch refill circuit; and
  the instruction processing circuit is further configured to:
    determine if the global allocation in the global allocation fail indicator exceeds a threshold global allocation;
      in response to the global allocation in the global allocation fail indicator exceeding the threshold global allocation, decrease a usefulness of a useful indicator in each fetch refill entry among the plurality of fetch refill entries in the pipeline fetch refill circuit; and
    determine if a usefulness in a useful indicator in a second fetch refill entry among the plurality of fetch refill entries in the pipeline fetch refill circuit falls below a threshold usefulness;
      in response to the usefulness in the useful indicator in the second fetch refill entry among the plurality of fetch refill entries in the pipeline fetch refill circuit falling below the threshold usefulness, deallocate the second fetch refill entry in the pipeline fetch refill circuit.

19. The processor of claim 1, wherein:
  the plurality of instructions comprises a branch instruction having a branch behavior;
  the instruction fetch circuit is configured to fetch the branch instruction into the instruction pipeline as a fetched branch instruction to be executed;
  the instruction processing circuit further comprises a control flow prediction circuit configured to predict the branch behavior of the branch instruction;
  the execution circuit is configured to execute the branch instruction to generate a resolved branch behavior of the branch instruction;
  the instruction processing circuit is further configured to:
    determine if the resolved branch behavior of the executed branch instruction matches the predicted branch behavior of the branch instruction; and
    update a branch predictor confidence corresponding to the branch instruction based on whether the resolved branch behavior matched the predicted branch behavior of the branch instruction; and
  the PDI detection circuit is configured to detect if the branch instruction in the instruction pipeline is a PDI based on the branch predictor confidence of the branch instruction.

20. The processor of claim 1, wherein:
the plurality of instructions comprises a memory operation instruction;
the instruction fetch circuit is configured to fetch the memory operation instruction into the instruction pipeline as a fetched memory operation instruction to be executed;
the execution circuit is configured to execute the memory operation instruction at a memory address of the memory operation instruction;
the instruction processing circuit is further configured to store a PDI indicator for the memory operation instruction as a PDI in response to the execution circuit generating the pipeline flush event to flush the instruction pipeline in response to the execution of the memory operation instruction; and
the PDI detection circuit is configured to detect if the memory operation instruction in the instruction pipeline is a PDI based on the PDI indicator for the memory operation instruction indicating a PDI.

21. A method of reusing fetched, flushed instructions in an instruction pipeline in a processor, comprising:
fetching a plurality of instructions as a plurality of fetched instructions from a program code into an instruction pipeline to be executed;
executing a fetched instruction among the plurality of fetched instructions in the instruction pipeline;
generating a pipeline flush event to flush the instruction pipeline in response to executing of a second fetched instruction among the plurality of instructions generating a hazard as a performance degrading instruction (PDI);
detecting whether a third fetched instruction in the instruction pipeline is a PDI as an instruction determined to cause a hazard when executed by an execution circuit causing a precise interrupt to be generated; and
in response to detecting the third fetched instruction as the PDI, further comprising:
allocating an available fetch refill entry among a plurality of fetch refill entries in a pipeline fetch refill circuit; and
storing a source identification of the third fetched instruction comprising one of a PDI and a successor instruction in a refill tag of the available fetch refill entry; and
in response to the pipeline flush event:
determining whether a source identification of the fetched instruction matches a source identification in a refill tag in a fetch refill entry as a matching fetch refill entry among the plurality of fetch refill entries of the pipeline fetch refill circuit; and
in response to the source identification of the fetched instruction matching the source identification in the refill tag in the fetch refill entry:
inserting one or more captured instructions in the matching fetch refill entry into the instruction pipeline as fetched instructions to be executed.

22. The method of claim 21, further comprising:
determining whether an instruction flow path of the PDI that is the third fetched instruction matches a refill path in the refill tag of the matching fetch refill entry, in response to the source identification of the PDI that is the third fetched instruction matching the source identification in the refill tag in the fetch refill entry; and
in response to the instruction flow path of the PDI that is the third fetched instruction matching the refill path in the refill tag of the matching fetch refill entry:
inserting the one or more captured instructions in the matching fetch refill entry into the instruction pipeline without re-fetching the one or more captured instructions to be processed.

23. The method of claim 21, further comprising:
detecting whether the third fetched instruction in the instruction pipeline is a PDI;
in response to detecting the third fetched instruction is a PDI:
allocating a second available fetch refill entry among the plurality of fetch refill entries in the pipeline fetch refill circuit; and
storing a source identification of one or more successor instructions following the detected PDI that is the third fetched instruction in the refill tag of the allocated second available fetch refill entry.

* * * * *